(12) United States Patent
Milovich (10) Patent No.: US 10,486,046 B2
(45) Date of Patent: Nov. 26, 2019

(54) HOCKEY TRAINING APPARATUS

(71) Applicant: Bradley Milovich, South Bend, IN (US)

(72) Inventor: Bradley Milovich, South Bend, IN (US)

(*) Notice: Subject to any disclaimer, the term of this patent is extended or adjusted under 35 U.S.C. 154(b) by 108 days.

(21) Appl. No.: 15/495,847

(22) Filed: Apr. 24, 2017

(65) Prior Publication Data

US 2017/0304703 A1 Oct. 26, 2017

Related U.S. Application Data

(60) Provisional application No. 62/438,014, filed on Dec. 22, 2016, provisional application No. 62/327,339, filed on Apr. 25, 2016.

(51) Int. Cl.
| | |
|---|---|
| *A63B 69/00* | (2006.01) |
| *A63B 21/00* | (2006.01) |
| *A63B 22/06* | (2006.01) |
| *A63B 21/22* | (2006.01) |
| *G09B 19/00* | (2006.01) |
| *A63B 23/04* | (2006.01) |

(52) U.S. Cl.
CPC ........ *A63B 69/0026* (2013.01); *A63B 21/225* (2013.01); *A63B 21/227* (2013.01); *A63B 21/4034* (2015.10); *A63B 21/4049* (2015.10); *A63B 22/0605* (2013.01); *A63B 22/0664* (2013.01); *A63B 23/0476* (2013.01); *G09B 19/0038* (2013.01); *A63B 2208/0233* (2013.01); *A63B 2209/10* (2013.01); *A63B 2225/09* (2013.01); *A63B 2225/093* (2013.01)

(58) Field of Classification Search
CPC . A63B 21/225; A63B 21/227; A63B 21/4049; A63B 21/4034; A63B 22/0605; A63B 22/0664; A63B 2225/093; A63B 2225/09; A63B 2209/10; A63B 2208/0233; G09B 19/0038
See application file for complete search history.

(56) References Cited

U.S. PATENT DOCUMENTS

| 4,693,468 A | * | 9/1987 | Kurlytis | ............. | A63B 21/0004 482/130 |
| 4,850,587 A | * | 7/1989 | Lin | ...................... | A63B 21/154 482/72 |
| 5,312,311 A | * | 5/1994 | Pearson | ........... | A63B 21/00178 482/57 |

(Continued)

*Primary Examiner* — Megan Anderson
(74) *Attorney, Agent, or Firm* — Quarles and Brady LLP (57) ABSTRACT

A hockey training apparatus may comprise a backrest. The backrest may support the back of a user during use. A harness may comprising one or two straps connected to the backrest. The user may pedal and practice puck stickhandling techniques that include moving the puck in front of the frame between a right side and a left side of the hockey training apparatus. The frame of the hockey training apparatus may comprise a back section in contact with a floor and a backrest tube for mounting and supporting a backrest post of the adjustable backrest. The frame may also have a middle section for mounting and supporting the crankset, pedals and axle and a front section in contact with the floor, but preferably without any handles or other structures in front of the user that would interfere with side to side movement of a hockey stick by the user.

15 Claims, 11 Drawing Sheets

(56) References Cited

U.S. PATENT DOCUMENTS

| | | | |
|---|---|---|---|
| 7,530,932 B2* | 5/2009 | Lofgren | A63B 22/0002 |
| | | | 482/62 |
| 8,113,996 B1* | 2/2012 | Allen | A63B 21/0088 |
| | | | 482/57 |
| 2013/0260967 A1* | 10/2013 | Chia | A63B 23/0476 |
| | | | 482/57 |
| 2017/0014674 A1* | 1/2017 | Lalaoua | A63B 22/0605 |

* cited by examiner

HOCKEY TRAINING APPARATUS

CROSS REFERENCE TO RELATED APPLICATIONS

This is a non-provisional patent application and claims benefit of the U.S. provisional patent application 62/438,014 filed on Dec. 22, 2016 and of the U.S. provisional patent application 62/327,339 filed on Apr. 25, 2016, which are hereby incorporated by reference.

FIELD OF THE INVENTION

The present invention generally relates to an apparatus that may be used by a hockey player to improve the hockey player's conditioning and hockey stickhandling ability.

SUMMARY OF THE INVENTION

The present invention provides an apparatus that may be used by a hockey player to simultaneously improve the conditioning and stick handling ability of a hockey player.

The hockey training apparatus may comprise an adjustable seat. The adjustable seat may include a seat post and a pivoting mechanism that securely supports the seat in a substantially horizontal position and yet allows a front portion of the adjustable seat to be pivoted down between 60 and 90 degrees about the pivoting mechanism.

The hockey training apparatus may also comprise a crankset and a pair of pedals configured to be pedaled by a user in a circular or elliptical motion.

The hockey training apparatus may also comprise a frame. The frame may have a back section with two legs configured to be in contact with a floor. The back section of the frame may also have a seat tube for mounting and supporting the seat post of the adjustable seat.

The hockey training apparatus may also comprise a middle section in front of the back section for mounting and supporting the crankset, the pair of pedals and wheel.

The hockey training apparatus may also comprise a front section in front of the middle section with at least one leg configured to be in contact with the floor. Thus, the frame may comprise the back section, the middle section and the front section in that order and be configured so that the user sitting in the adjustable seat over the back section is looking towards the middle section and the front section.

In an example embodiment, the front section does not include any physical structure that would be higher than the highest point of the crankset when pedaled.

In another example embodiment, the front section is configured to not interfere with the user when the user moves a puck between a left side and a right side of the frame.

In another example embodiment, the front section does not have a physical structure designed or configured for placing the hands of the user, such as a handle bar.

In another example embodiment, the hockey training apparatus does not have a seat, but the hockey training apparatus does have a backrest. The backrest is preferably able to be horizontally and vertically positioned to allow the user to rest the user's back against the backrest when the hockey training apparatus is being used. In a preferred embodiment, a seat and the backrest may be interchangeable on the hockey training apparatus. The seat and backrest may have similar sized rods attached to them allowing either the rod for the seat or the rod for the backrest to be slid into a tube on the hockey training apparatus, thereby allowing a user to use either the seat or the backrest as desired.

When the backrest is being used, a harness, comprising one strap that goes through the backrest or two straps where each strap is attached at one end to one of the ends of the backrest, may be connected to the backrest. The ends of the strap(s) not attached to the backrest may include Velcro, buckles, snaps or any other desired quick release locking and unlocking device. The strap or straps are thus configured to wrap around a waist of the user of the hockey training apparatus, thereby providing support to the user in a manner similar to a seat belt.

In another example embodiment, a brake, having a brake handle, may be used to slow or stop a flywheel that provides resistance during pedaling of the hockey training apparatus. In some embodiments, the flywheel freewheels and continuous to spin even after pedaling has stopped. In other embodiments, reverse pedaling may be used to slow or stop the flywheel. In still other embodiments, the pair of pedals and flywheel are connected such that the pair of pedals and flywheel move or don't move together and at the same time.

In another example embodiment, the frame of the hocking training apparatus may include a rear floor base bar. In preferred embodiments, the rear floor base bar may fold in or up to make the hocking training apparatus easier to transport. In other embodiments, a flexible wall may be attached to the hockey training apparatus to create a perimeter that prevents balls or pucks from leaving the area immediately in front of the user using the hockey training apparatus.

In another example embodiment, a first sensor may be used to measure the speed of the flywheel to enable the hockey training apparatus to determine an RPM, speed, distance and/or any other metric desired by the user that reflects on the pedaling being performed by the user.

In another example embodiment, a second sensor may be used to measure a speed and/or location of a hockey stick and/or ball or puck in front of the hockey training apparatus. This enable the hockey training apparatus to access stickhandling techniques, stick speed and/or puck shot speed.

In another example embodiment, one or more monitors may be used to provide a virtual reality situation for the user of the hockey training apparatus. As a specific example, different situations in a hockey game may be displayed on the monitor(s) to the user. Reaction times, stickhandling techniques and/or pedaling performance may be measured with various metrics and/or scores displayed to the user based on the user's performance and reactions to the video.

The disclosed embodiments allow hockey players to increase their strength, explosiveness, conditioning, stamina, core balance, coordination, and stickhandling skills. The best way to get better at hockey is to play more hockey. Unfortunately, ice time is expensive at $200/hr and often in short supply due to the high demand and limited rinks per area. Outdoor rinks are contingent upon geographic location and weather conditions.

Hockey teams and players at every level incorporate exercise bikes into their off-season and in-season training routines. The disclosed embodiments provide an open front design which gives players a full body workout and hockey playing simulation over traditional exercise bikes. The disclosed embodiments allow users to sit on the seat like a traditional bike seat. However, the user can quickly adjust the seat to a down position while riding allowing the user to lean back against the seat rather than sitting on top of the seat. The downward position increases the required leg strength, energy, balance, core strength, and stamina replicating the feeling of being on the ice for a normal shift in a hockey game. A regular game shift typically lasts 30-120 seconds in a full sprint before rotating in the other line of players. The open front design of the hockey training apparatus without handlebars allows a user to stickhandle in a 360 degree radius while riding and pedaling. This replicates the eye-hand coordination, core muscle strength, coordination, and side to side lateral changes players experience during an actual hockey game.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 1:
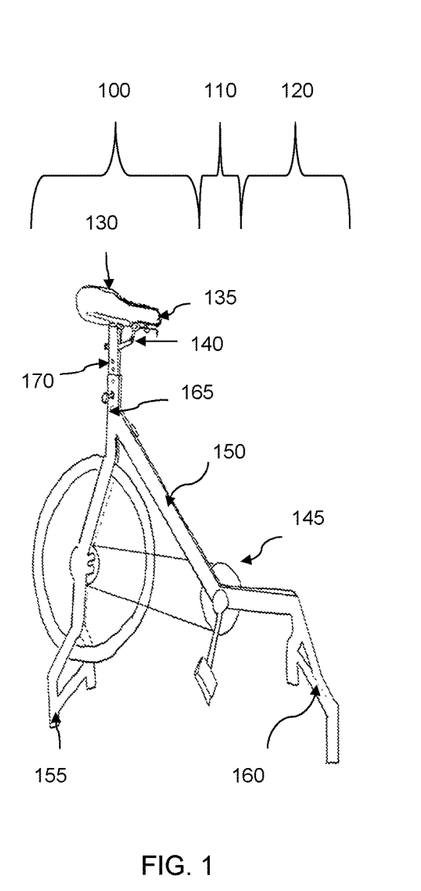
FIG. 1 is an illustration of a hockey training apparatus with an adjustable seat in a substantially horizontal position, configured to support the weight of a user, for use as a stationary bike without a hand support structure or handle bar in front of the user.

FIG. 1 is an illustration of a hockey training apparatus. An adjustable seat 130 is illustrated in a substantially horizontal position. The substantially horizontal position of the adjustable seat 130 is hereby defined as the position that a biker would position the seat 130 in normal bike riding conditions. The adjustable seat 130 in the illustrated position is configured to support the weight of the biker during use as a stationary bike. The hockey training device with the seat 130 in the substantially horizontal position as illustrated in FIG. 1 is preferably used as a stationary bike for conditioning.

Figure 2:
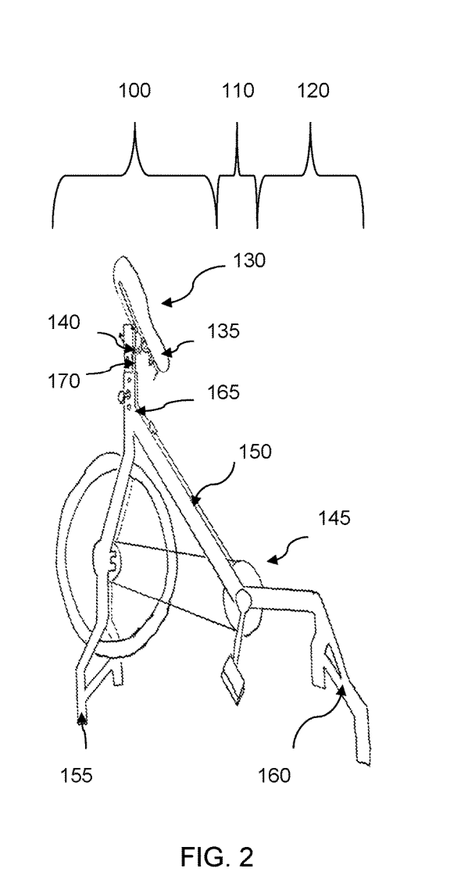
FIG. 2 is an illustration of the hockey training apparatus in FIG. 1 with the adjustable seat pivoted down between 60 and 90 degrees about a pivoting mechanism, for practicing moving a puck back-and-forth between a right side and a left side of the hockey training apparatus while pedaling without a hand support structure or handle bar in front of the user.

FIG. 2 is an illustration of the hockey training apparatus in FIG. 1, but with the adjustable seat 130 pivoted between 60 and 90 degrees about a pivoting mechanism 140 so that a front portion 135 of the adjustable seat 130 is rotated or pivoted down. The hockey training apparatus with the seat 130 pivoted or rotated down as shown in FIG. 2 is preferably used for practicing moving a puck back-and-forth between a right side and a left side of the hockey training apparatus while the user is pedaling the hockey training apparatus. The pedaling action simulates the movement of the legs of a hockey player while skating and thus allows the hockey player to practice puck movement while moving the legs of the hockey player in a realistic motion similar to that used while playing hockey.

The hockey training apparatus does not have a hand support structure, a handle bar or any other physical structure in front of the user that would hinder or interfere with the user moving the puck with a hockey stick back-and-forth between the left side and the right side of the hockey training apparatus.

The adjustable seat 130 comprises a seat, a seat post 170 and a pivoting mechanism 140 that securely supports the seat 130 in a substantially horizontal position and allows the front portion 135 of the adjustable seat 130 to be pivoted down between 60 and 90 degrees about the pivoting mechanism 140. Any pivoting mechanism 140 may be used to rotate or pivot the adjustable seat 130 between a substantially horizontal position (bike riding position) and down between 60 and 90 degrees about the pivoting mechanism 140. In preferred embodiments, the adjustable seat 130 may be easily pivoted or rotated about the pivoting mechanism 140 without the use of tools and merely by using the fingers of the user.

Figure 3:
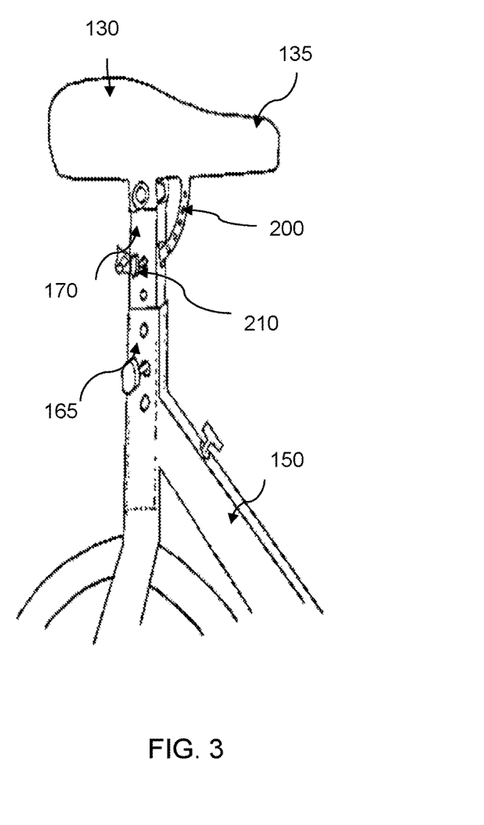
FIG. 3 is an illustration of a non-limiting example of a pivoting mechanism that may be used as part of the hockey training apparatus illustrated in FIGS. 1 and 2. The illustrated pivoting mechanism comprises a curved arm with engagement holes and a catch pin. The illustrated adjustable seat is locked in a substantially horizontal position and configured to support the weight of the user while the user is pedaling on the hockey training apparatus.

FIG. 3 illustrates a non-limiting example of a pivoting mechanism 140 that may be used as part of the hockey training apparatus illustrated in FIGS. 1 and 2. The illustrated adjustable seat 130 may be locked in a substantially horizontal position and configured to support the weight of the user while the user is pedaling on the hockey training apparatus.

Figure 4:
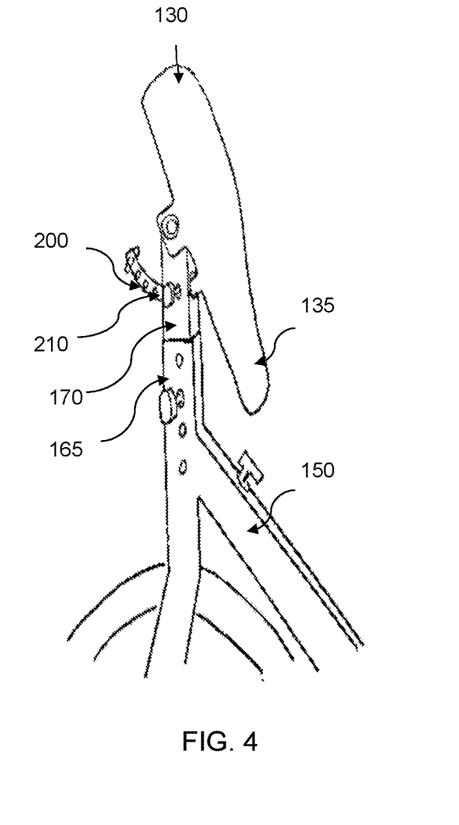
FIG. 4 is an illustration of the pivoting mechanism illustrated in FIG. 3. In this illustration, the front of the adjustable seat is pivoted down between 60 and 90 degrees about the pivoting mechanism and preferably locked in the illustrated position.

FIG. 4 illustrates the pivoting mechanism 140 illustrated in FIG. 3. In this illustration, a front portion 135 of the adjustable seat 130 is pivoted down between 60 and 90 degrees about the pivoting mechanism 140 and the adjustable seat 130 may be locked in this position. The pivoting mechanism 140 illustrated in FIGS. 3 and 4 may comprise a curved arm with a plurality of engagement holes 200 and a catch pin 210. A spring, not shown, may be used to bias the catch pin 210 into one of the engagement holes. The user may pull the catch pin 210 against the resistance of the spring to remove the catch pin 210 from an engagement hole allowing the adjustable seat 130 to be rotated or pivoted about the pivoting mechanism 140.

Figure 5:
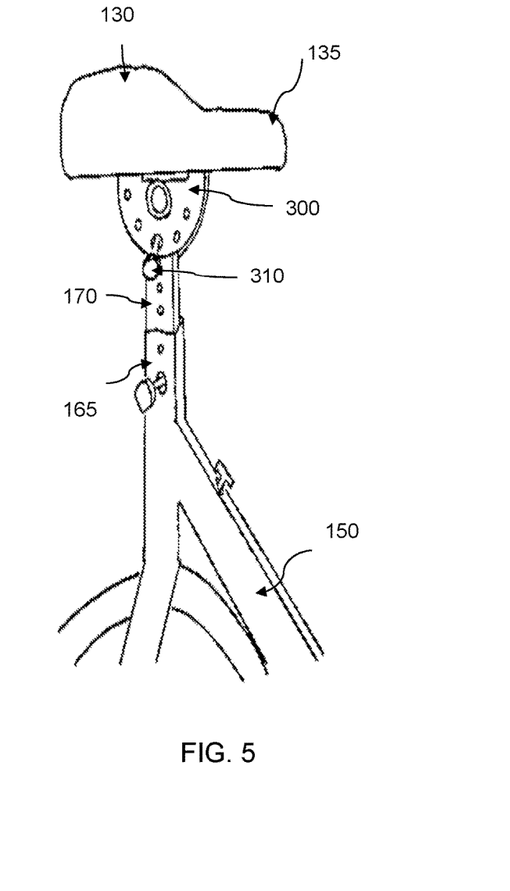
FIG. 5 is an illustration of a non-limiting example of a pivoting mechanism that may be used as part of the hockey training apparatus illustrated in FIGS. 1 and 2. The illustrated pivoting mechanism comprises part of a circular disk or pin wheel with engagement holes and a catch pin. The illustrated adjustable seat is locked in a substantially horizontal position and configured to support the weight of the user while the user is pedaling on the hockey training apparatus.

FIG. 5 illustrates another non-limiting example of a pivoting mechanism 140 that may be used as part of the hockey training apparatus illustrated in FIGS. 1 and 2. The illustrated adjustable seat 130 may be locked in a substantially horizontal position and configured to support the weight of the user while the user is pedaling on the hockey training apparatus.

Figure 6:
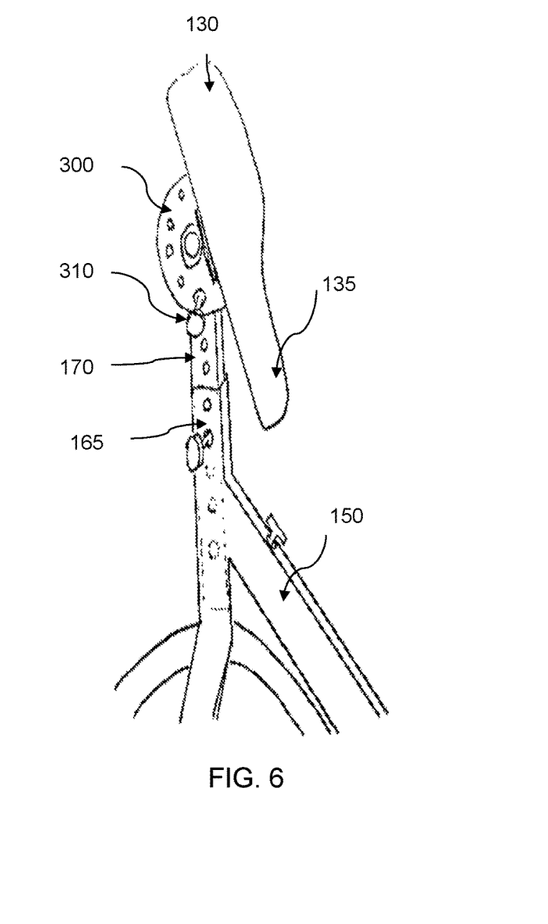
FIG. 6 is an illustration of the pivoting mechanism illustrated in FIG. 5. In this illustration, the front of the adjustable seat is pivoted down between 60 and 90 degrees about the pivoting mechanism and preferably locked in position.

FIG. 6 illustrates the pivoting mechanism 140 illustrated in FIG. 5. In this illustration, a front portion 135 of the adjustable seat 130 is pivoted down between 60 and 90 degrees about the pivoting mechanism 140 and the adjustable seat 130 may be locked in this position. The pivoting mechanism 140 illustrated in FIGS. 5 and 6 may comprise part of a pin wheel with a plurality of engagement holes 300 and a catch pin 310. The catch pin 310 may be fastened to the seat post 170 rather than the pin wheel. A spring, not shown, may be used to bias the catch pin 310 into one of the engagement holes. The user may pull the catch pin 310 against the resistance of the spring to remove the catch pin 310 from an engagement hole allowing the adjustable seat 130 to be rotated or pivoted about the pivoting mechanism 140.

Figure 7:
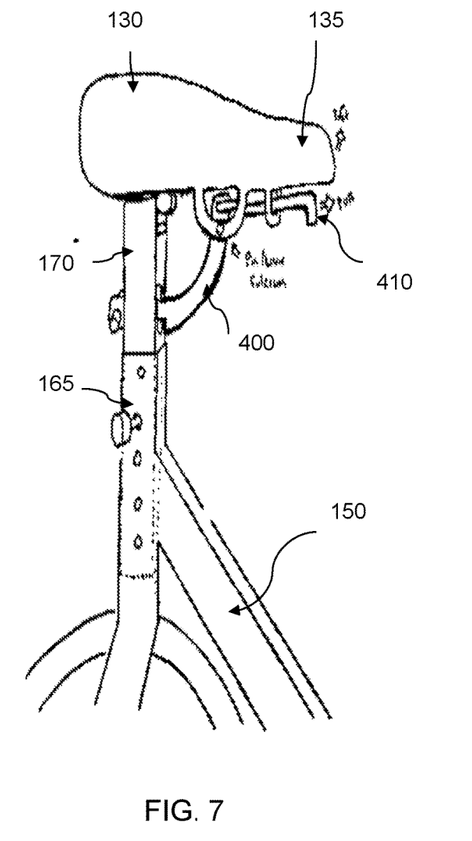
FIG. 7 is an illustration of a non-limiting example of a pivoting mechanism that may be used as part of the hockey training apparatus illustrated in FIGS. 1 and 2. The illustrated pivoting mechanism comprises a curved arm with a catch and a pull arm. The illustrated adjustable seat is locked in a substantially horizontal position and configured to support the weight of the user while the user is pedaling on the hockey training apparatus.

FIG. 7 illustrates another non-limiting example of a pivoting mechanism 140 that may be used as part of the hockey training apparatus illustrated in FIGS. 1 and 2. The illustrated adjustable seat 130 may be locked in a substantially horizontal position and configured to support the weight of the user while the user is pedaling the hockey training apparatus.

Figure 8:
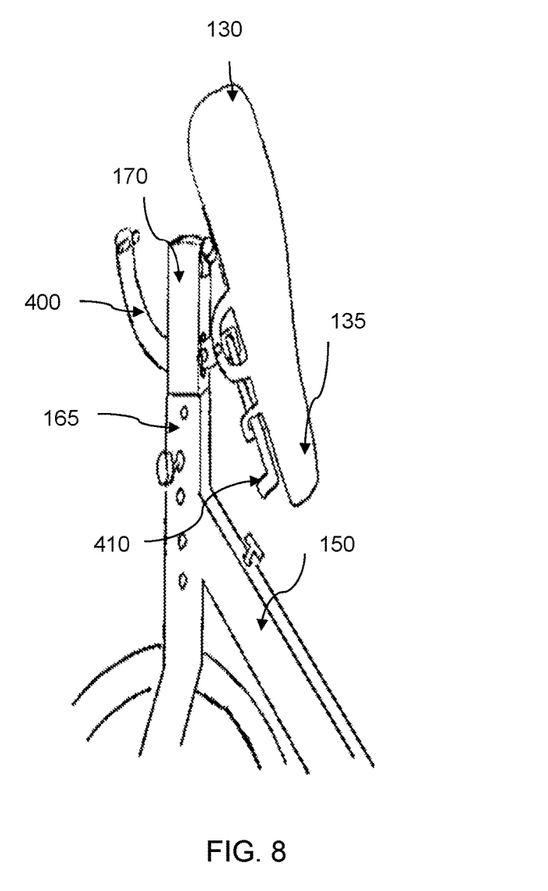
FIG. 8 is an illustration of the pivoting mechanism illustrated in FIG. 7. In this illustration, the front of the adjustable seat is pivoted down between 60 and 90 degrees about the pivoting mechanism.

FIG. 8 illustrates the pivoting mechanism 140 illustrated in FIG. 7. In this illustration, a front portion 135 of the adjustable seat 130 is pivoted down between 60 and 90 degrees about the pivoting mechanism 140 and the adjustable seat 130 may be locked in this position. The pivoting mechanism 140 illustrated in FIGS. 7 and 8 may comprise a curved arm with a catch 400 and a pull arm 410. The user may pull the pull arm 410 which will raise the catch on the curved arm 400 above a mechanical stop allowing the seat 130 to be moved or pivoted between the substantially horizontal position and the pivoted down, between 60 and 90 degrees, position.

The hockey training apparatus may have an adjustable seat 130, a frame 150, a crankset 145 and a pair of pedals 1810.

The frame 150 may have a back section 100, a middle section 110 and a front section 120. The back section 100 is behind the middle section and the front section 120 is in front of the middle section. The back section 100, middle section 110 and front section 120 are for descriptive purposes only as the frame 150 is preferably constructed to be a single strong platform for supporting the rider on the adjustable seat 130 or during pedaling. The frame 150 may be made of any strong material, such as, as non-limiting examples, steel, aluminum, graphite or some combination thereof.

The adjustable seat 130 may be positioned on the back section 100 of the frame 150 so that the user/rider is facing towards the middle section 110 and the front section 120 of the frame 150. In other words, the user may sit on the adjustable seat 130 and face towards the middle section 110 and the front section 120 of the frame 150. The adjustable seat 130 may include a seat post 170 that is inserted into a seat tube 165 created in the back section 100 of the frame 150 of the hockey training apparatus.

The back section 100 may also provide support for a bike wheel or other device that creates resistance to the pedaling action of the user. The back section 100 also preferably has at least two legs 155 configured to be in contact with a floor.

The middle section 110 of the frame 150 may house and support a crankset 145 and a pair of pedals 1810 configured to be pedaled by the user/rider in a circular or elliptical motion. In a preferred embodiment, turning the crankset 145 in the middle section 110 of the frame 150 turns a wheel, via a chain, mounted in the back section 100 of the frame 150. In some embodiments, a resistance dial may be added to increase or decrease the resistance of the pedaling using any known or later developed technique.

The front section 120 of the frame 150 may have one or two legs 160, 1800 configured to be in contact with the floor and raise the crankset 145 and the pair of pedals 1810 off the floor sufficiently to allow the user/rider to pedal the hockey training apparatus without the crankset 145 or the pair of pedals 1810 coming into contact with the floor. In preferred embodiments, the front section 120 does not have any physical structure that would prevent a user/rider from moving a puck using a hockey stick by the user/rider between a right side of the frame 150 and a left side of the frame 150. In preferred embodiments, no part of the front section 120 is vertically higher than a highest point of the crankset 145 when the crankset 145 is being peddled by the user and the front section 120 of the frame 150 may even be slanted down. This provides an open unrestricted area in front of the frame 150 of the hockey training apparatus for the user/rider to practice hockey stick handling techniques while the front section 120 still supports the frame 150.

The hockey training apparatus may be used as a normal bike for conditioning when the seat 130 is in the substantially horizontal position. The adjustable seat 130 may be adjusted down. When the adjustable seat 130 is pivoted or rotated down, the user may continue to pedal, simulating leg movement of a hockey player while skating, and practice stick handling techniques by moving a puck back-and-forth between a left side of the apparatus and a right side of the apparatus.

Referring to FIGS. 13-16, another embodiment of the invention is illustrated. In this embodiment, the hockey training apparatus does not have or is not using a seat 130 as in the embodiments illustrated in FIGS. 1-8 and 12. In this embodiment, the seat is replaced with a backrest 1300 and one or two straps 1310 that may act as a harness to thereby allow a user to lean forward over the user's waist to practice the user's stickhandling skills. The backrest 1300 preferably has a curved shape such that a portion of the backrest extends on the left side of the user and a portion of the backrest extends on the right side of the user. These extensions of the backrest 1600 have the advantage of supporting the user when the user leans left or right while using the hockey training apparatus.

In an embodiment, the strap is made of a single piece of material that runs through the length of the backrest 1300 and is of sufficient length to extend beyond the backrest 1300 on both ends of the backrest 1300 as shown in FIGS. 13-16. In a preferred embodiment, the strap is about 55 inches long, but shorter or longer straps 1310 may also be used, depending on the size of the user. The portions of the strap that extends beyond the backrest 1300 may be positioned around the waist of the user and the strap's ends connected to hold the user on the hockey training apparatus.

In another embodiment, the hockey training apparatus may have two straps 1310, wherein each strap is connected to and extends from each end of the backrest 1300. The two straps 1310 may be positioned around the waist of the user and the two strap's ends may be connected to hold the user on the hockey training apparatus.

The end of the strap or straps 1310 may be fastened to each other by Velcro, buckles, snaps, or any other desired quick release locking and unlocking device. The strap or straps 1310 are preferably made of nylon, but may be made of any other durable material that is able to withstand the stress of a user physically moving around and practicing on the hockey training apparatus over extended periods of practice time. In other embodiments, the strap or straps 1310 may be made of a slightly elastic that allows the straps 1310 to stretch several inches, such as between one and three inches, to improve the comfort of wearing the strap or straps 1310 as a harness.

A horizontal adjustment 1320 may comprise a pin or other locking mechanism that allows a first pole on the back of the backrest 1300 to slide in a horizontal direction through a horizontal adjustment tube, thereby allowing the backrest 1300 to be positioned at different horizontal locations or positions over the pair of pedals 1810.

A vertical adjustment 1330 may comprise a pin or other locking mechanism that allows a second pole attached to the horizontal adjustment tube to slide in a vertical direction through a tube of the frame of the hockey training apparatus, thereby allowing the backrest 1300 to be positioned at different vertical locations or positions behind the user.

The hockey training apparatus may thus be configured with either a seat or a backrest 1300, as desired by the user. In some embodiments, the hockey training apparatus may be configured so that a seat and a backrest 1300 may be interchangeable so that the user may use either the seat or the backrest 1300 whenever desired.

In another embodiment, the backrest 1300 may include a padded surface and act as a seat, possibly when the backrest 1300 is rotated, so that the backrest 1300 lies in a flat position thereby giving the rider the ability to sit on top of the backrest 1300 to rest as the user takes weight off the pair of pedals 1810 and sits on top of the backrest 1300.

Figure 15:
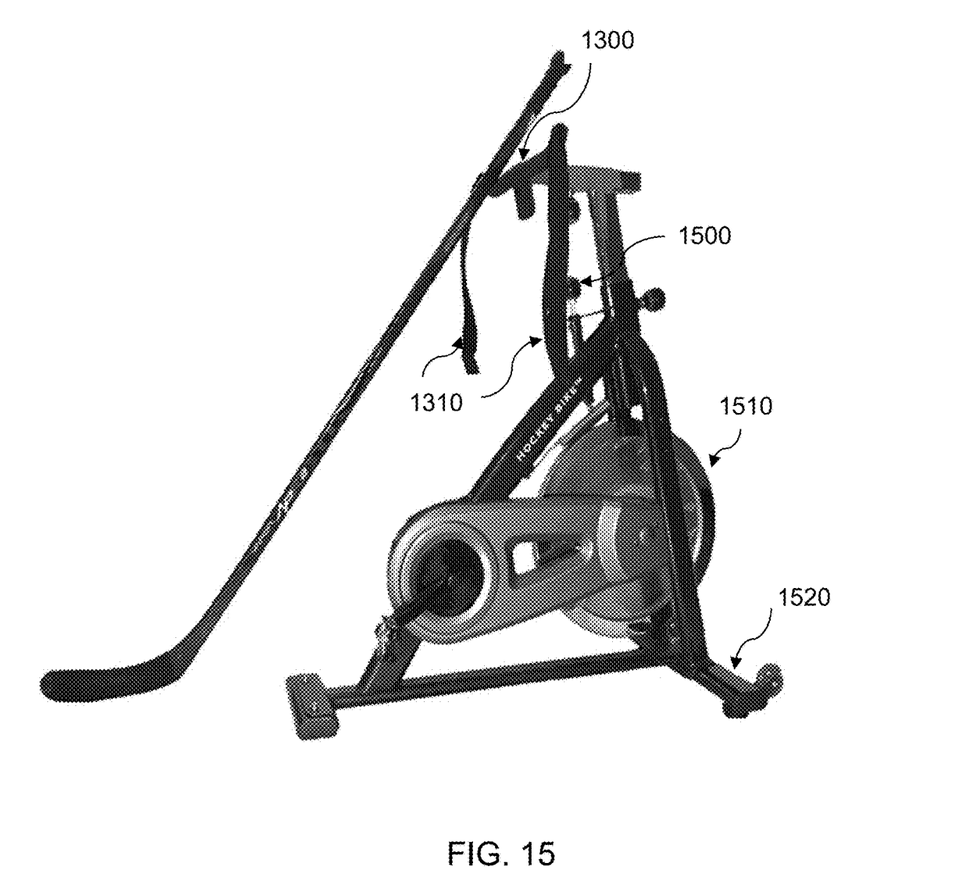
FIG. 15 is a perspective view of an embodiment of the hockey training apparatus with a backrest and two straps, but no seat.
Figure 16:
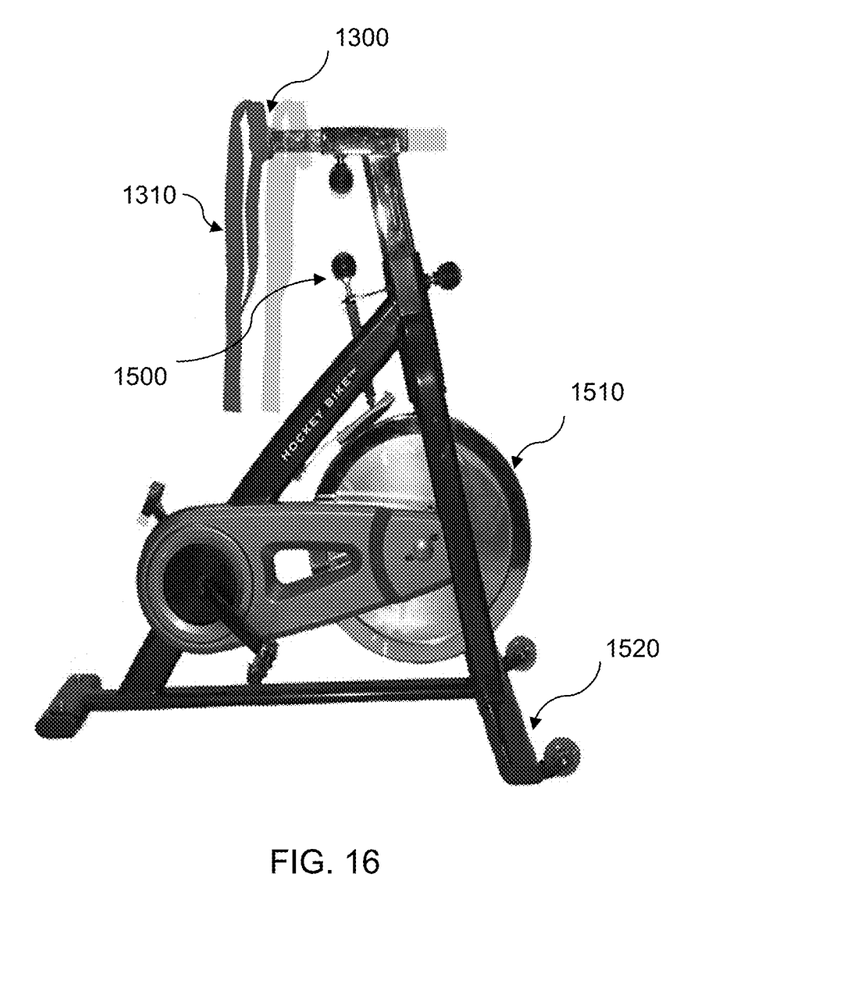
FIG. 16 is a side view of an embodiment of the hockey training apparatus with a backrest and two straps, but no seat.

The hockey training apparatus may also comprise a flywheel 1510 that provides resistance during the bicycling or pedaling motion of the user. A brake may be able to slow and stop the flywheel 1510 as desired by the user. A handle for engaging the brake is preferably positioned on the hockey training apparatus where the user may engage the brake while using the hockey training apparatus. As examples, the brake handle 1500 may be on the backrest 1300 or on the frame of the hockey training apparatus. In other embodiments, reverse pedaling the pair of pedals 1810 may be used to slow or stop the flywheel 1510.

The pair of pedals 1810 and flywheel 1510 may be connected in any desired manner. As non-limiting examples, the flywheel 1510 may be freewheel and continue to spin even when the user is not pedaling the pair of pedals 1810. In another embodiment, the pair of pedals 1810 and flywheel 1510 are fixed and move together, where the pair of pedals 1810 and flywheel 1510 move or don't move together at the same time in the same direction.

To improve transportability of the hockey training apparatus, the flywheel 1510 may have a quick release mechanism for easily removing the flywheel 1510 from the hockey training device.

The frame of the hockey training apparatus may include a rear floor base bar 1520. In preferred embodiments, the rear floor base bar 1520 may fold in or up to decrease the width of the bike for easier transportation, to fit through doorways and/or put into vehicles. A wheel may be attached to each end of the rear floor base bar 1520 to enable the hockey training apparatus to roll on the wheels when tipped back onto the wheels.

In other embodiments, attachments may be placed on the rear floor base bar 1520 to attach a plastic or rubber flexible wall that would create a perimeter around the bike to prevent the ball or puck from getting away from the rider, thereby eliminating the problem of making the user have to get on and off the hockey training apparatus to get the ball or puck.

Figure 17:
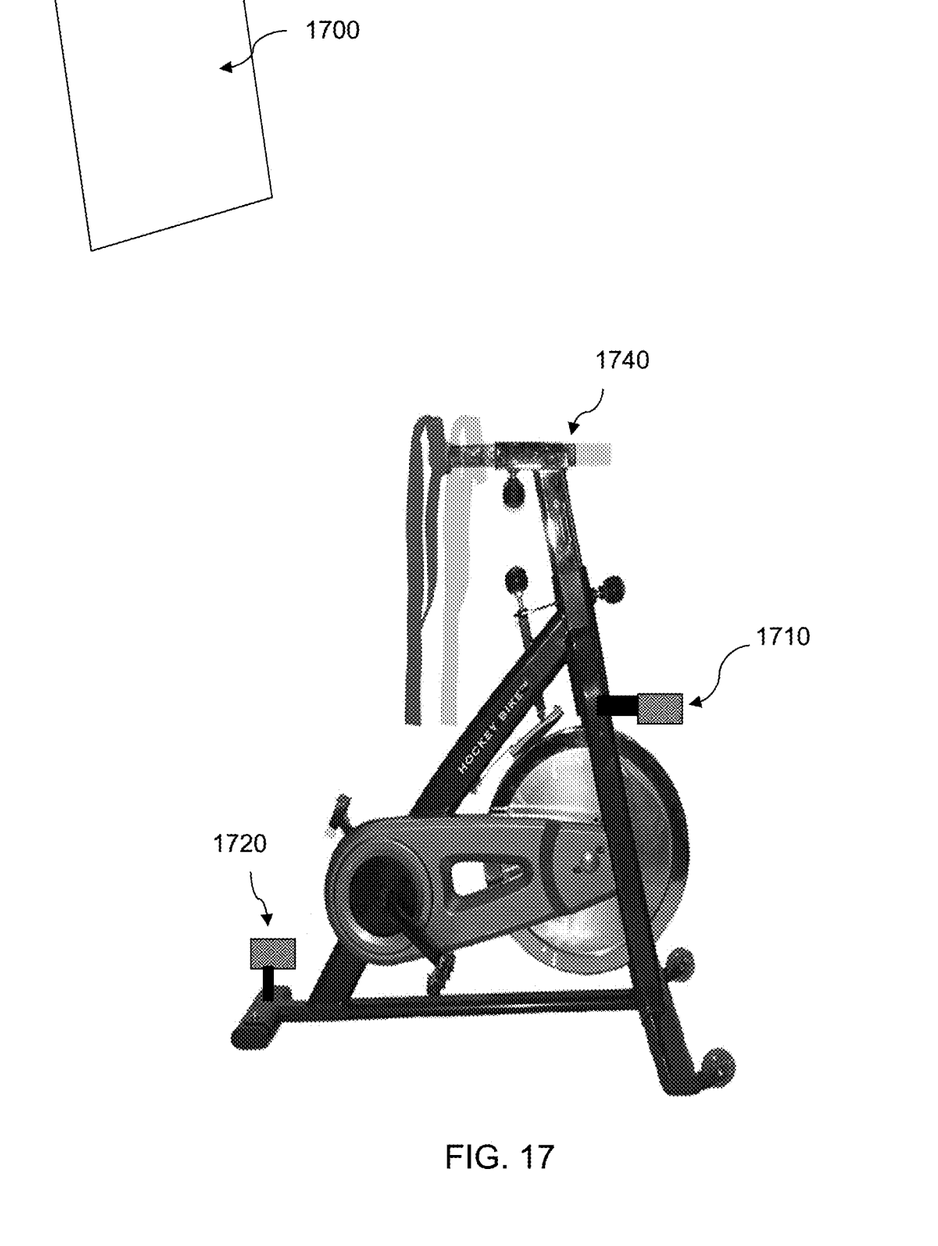
FIG. 17 is a side view of an embodiment of a monitor connected to the hockey training apparatus with a first sensor for measuring the speed of a flywheel and a second sensor for measuring a speed and/or location of a hockey stick and/or ball or puck in front of the hockey training apparatus.

Referring to FIG. 17, a first sensor 1710 may be mounted on the hockey training apparatus and used to track the speed and/or duration of the flywheel 1510 movements to determine, as non-limiting examples, the RPMs, speed, distance and other metrics for the pedaling of the hockey training apparatus by the user.

A second sensor 1720 may be mounted to the front of the hockey training apparatus and used to track the location and/or speed of the hockey stick and/or puck. Specifically, the second sensor 1720 may measure and record the stick speed, forehand to backhand transitions, backhand to forehand transitions and/or shot speed.

One or more monitors 1700 may be connected to the hockey training apparatus. The connection between the monitor(s) 1700 and the hockey training apparatus may use wire or wireless technologies. The hockey training apparatus may have one or more video hook ups 1740 to the monitor(s) 1700 that may act as virtual reality screens.

A video of a hockey game may be displayed on the monitor(s) 1700 to the user of the hockey training apparatus. The user may have to perform various stickhandling techniques based on what's on the monitor(s) 1700, such as where the other players appear on the monitor(s) 1700. The second sensor 1720 may sense the location of the user's stick and puck and transmit this information to a processing unit. The processing unit may evaluate the user's speed/timing, selected stickhandling techniques and their performance in response to what was being displayed on the monitor(s) 1700, possibly in combination with the user's pedaling speed of the hockey training apparatus as determined by the first sensor 1710.

Figure 18:
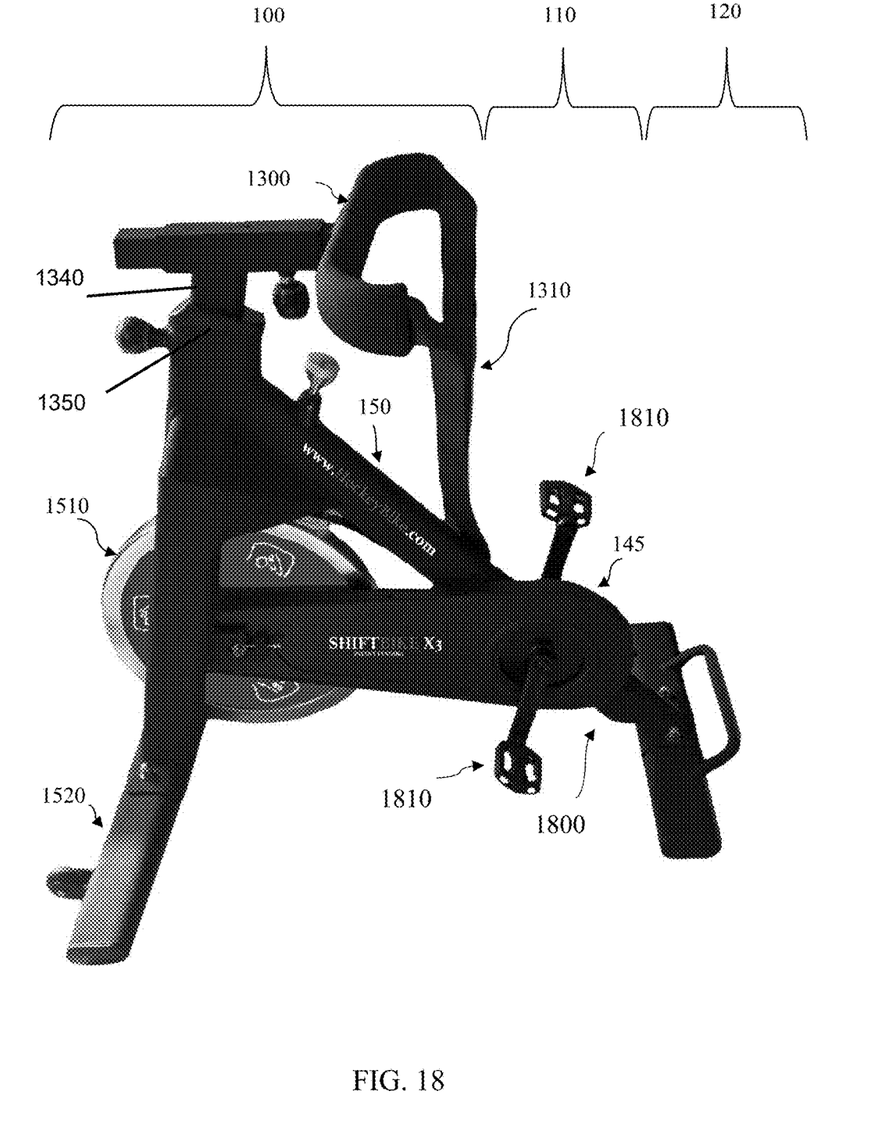
FIG. 18 is a side view of an embodiment of the hockey training apparatus.

FIG. 18 illustrates another embodiment of a conditioning and training apparatus, which may be and specifically used as a hockey training apparatus. The illustrated conditioning and training apparatus may comprise a curved backrest 1300 connected to a backrest post 1340. The curved backrest 1300 may be shaped as a "C" or a "U" and be a half circle or a half ellipse. Alternatively, the curved backrest 1300 may have a straight middle section 110 with the ends curved so as to wrap around the sides of the user. The curved backrest 1300 may be used to support a back of a user during a use of the conditioning and training apparatus.

Figure 9:
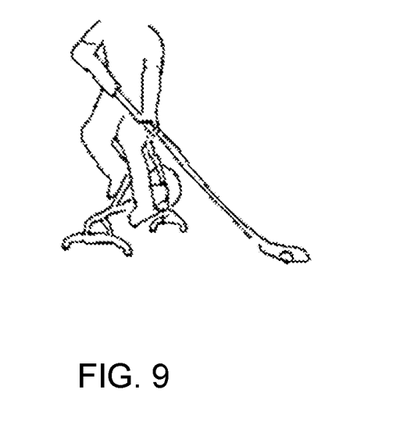
FIGS. 9-11 are illustrations of a user/biker/hockey player using the hockey training device to simultaneously improve the conditioning and stick handling ability of a hockey player while the seat is pivoted down between 60 and 90 degrees.
Figure 10:
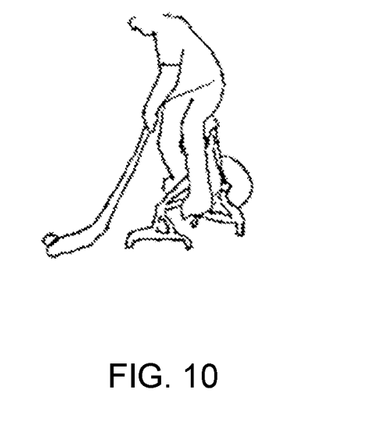
Figure 11:
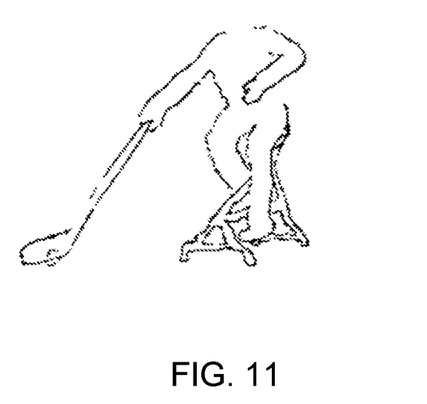
Figure 12:
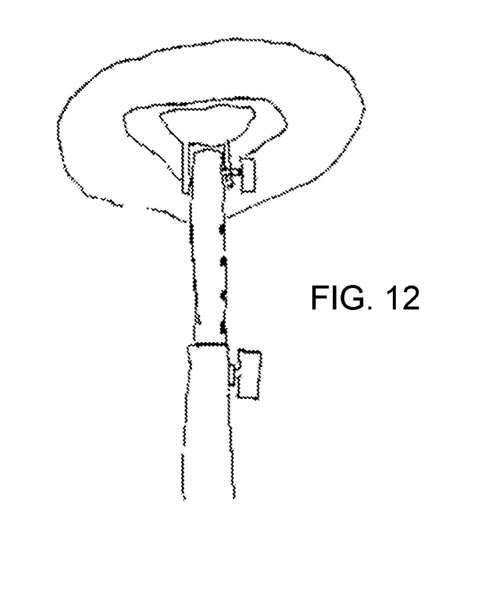
FIG. 12 is an illustration of a catch pin engaged with the seat post to either securely lock the seat in a normal riding position or to securely lock the seat in a position so that front portion of the seat is pivoted down between 60 and 90 degrees to allow the user/biker/hockey player to simultaneously improve the conditioning and stick handling ability of the hockey player.
Figure 13:
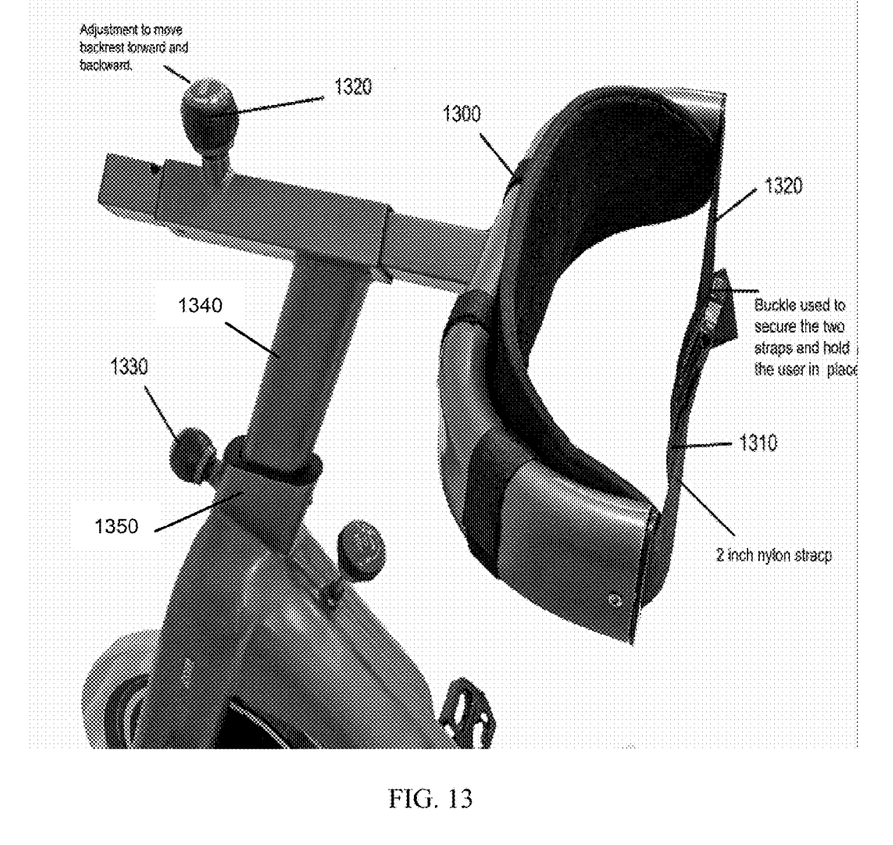
FIG. 13 is an illustration of a side view of a backrest and two straps that may be used instead of a seat as part of the hockey training apparatus.
Figure 14:
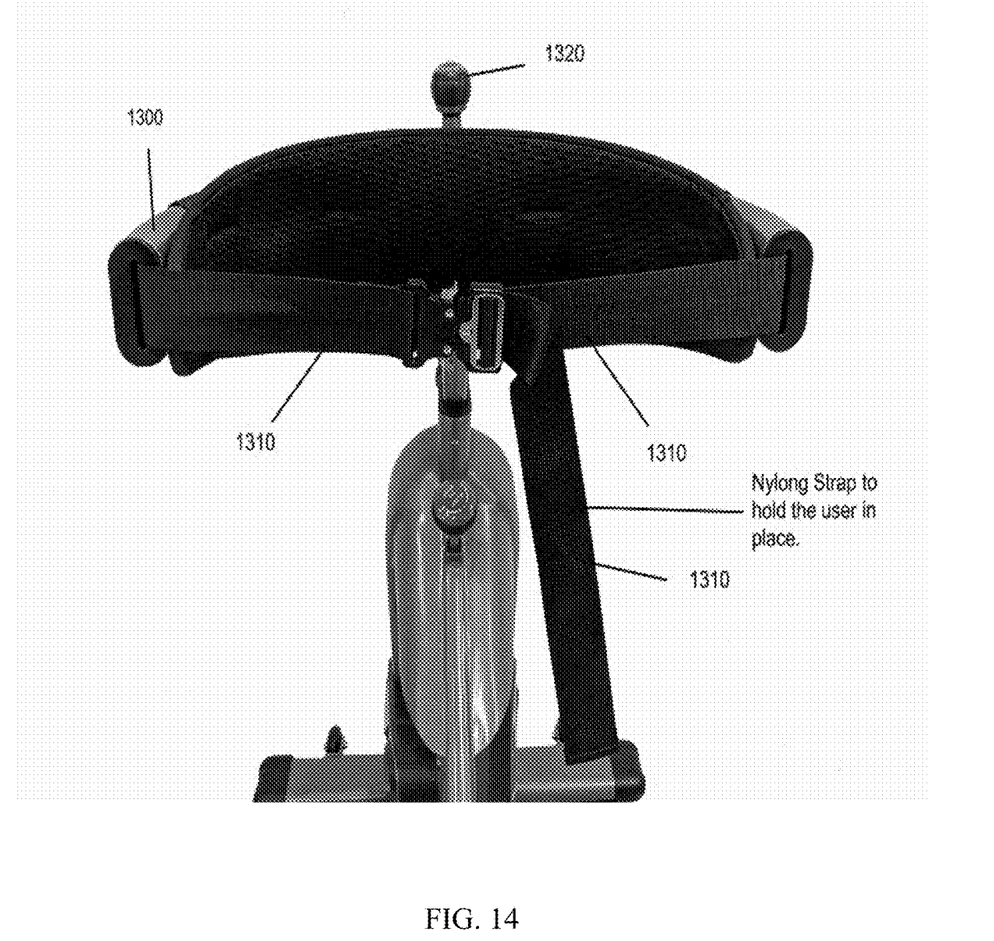
FIG. 14 is an illustration of the backrest and two straps that may be used instead of a seat as part of the hockey training apparatus.

The use of the conditioning and training apparatus is hereby defined to mean that the user has mounted the conditioning and training device and is pedaling a crankset 145 connected to a pair of pedals 1810 in a circular or elliptical motion as illustrated in FIGS. 9-11. Thus, merely transporting or moving the conditioning and training apparatus does not constitute a use of the conditioning and training apparatus.

The conditioning and training apparatus also comprises a frame 150. The frame 150 may have a back section 100, a middle section 110 and a low-profile front section 120. The back section 100 may have a backrest tube for mounting and supporting the backrest post 1340. In preferred embodiments, the back section 100 is configured to be in contact with a floor. As a non-limiting example, the back section 100 may be in contact with the floor via a rear floor base bar 1520.

The frame 150 may also comprise a middle section 110 in front of the back section 100 for mounting and supporting the crankset 145 and the pair of pedals 1810.

The frame 150 may also comprise a front section 120 in front of the middle section 110 configured to be in contact with the floor. The front section 120 preferably has a low profile and preferably does not comprise any physical structure designed for placing hands of the user during the use of the conditioning and training apparatus. The conditioning and training apparatus also preferably does not comprise any physical structure that would interfere with the user moving a puck between a left side and a right side of the frame 150 using a hockey stick. The front section 120 also preferably does not comprise any physical structure that is higher than the highest point of the crankset 145 when pedaled during the use of the conditioning and training apparatus.

A wheel 1510, which may be a flywheel, may be mounted to the frame 150 and mechanically connected to the crankset 145, wherein the wheel 1510 is configured to provide resistance when the user pedals the crankset 145 during the use of the conditioning and training apparatus.

In some embodiments, a strap 1310 may pass through a hollow passage formed through the curved backrest 1300. For this embodiment, the curved backrest 1300 must be made hollow so that the curved backrest 1300 forms a hollow curved tube or curved cylinder. The strap 1310 may comprise a first end with a quick release locking and unlocking device and a second end with a quick release locking and unlocking device. The quick release locking and unlocking device for the first end and the second end of the strap 1310 may be made from any suitable device, such as, as non-limiting examples, Velcro or quick release buckles.

In some embodiments, a first strap 1310 with a first end may be connected to the curved backrest 1300 and a second end may be connected to a quick release locking and unlocking device. A second strap 1310 with a first end may be connected to the curved backrest 1300 and a second end may be connected to a quick release locking and unlocking device. The quick release locking and unlocking device for the first strap 1310 and the second strap 1310 may be made from any suitable device, such as, as non-limiting examples, Velcro or quick release buckles.

While the specification uses the words user, rider and hockey player, it should be understood that these words are interchangeable and refer to the same person using the above described hockey training apparatus or conditioning and training apparatus.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A conditioning and training apparatus, comprising:
    a curved backrest connected to a backrest post, wherein the curved backrest is configured to support a back of a user during use of the conditioning and training apparatus;
    a crankset and a pair of pedals, wherein the pair of pedals are configured to be pedaled by feet of the user in a circular or elliptical motion during use of the conditioning and training apparatus;
    a frame comprising:
        a back section comprising a backrest tube for mounting and supporting the backrest post, wherein the back section is configured to be in contact with a floor,
        a middle section in front of the back section for mounting and supporting the crankset and the pair of pedals, and
        a front section in front of the middle section with at least one leg configured to be in contact with the floor; and
    wherein the conditioning and training apparatus does not comprise a physical structure in front of the user designed and configured for placing hands of the user during use of the conditioning and training apparatus.

2. The conditioning and training apparatus of claim 1, further comprising:
    a strap passing through a hollow passage formed through the curved backrest and the strap comprising a first end with a first quick release locking and unlocking device and a second end with a second quick release locking and unlocking device.

3. The conditioning and training apparatus of claim 2, wherein the first quick release locking and unlocking device for the first end of the strap and the second quick release locking and unlocking device for the second end of the strap comprises hook and loop fasteners.

4. The conditioning and training apparatus of claim 1, wherein the conditioning and training apparatus does not comprise a seat designed and configured to receive a butt of the user.

5. The conditioning and training apparatus of claim 1, wherein the conditioning and training apparatus is configured such that the user is capable of moving a hockey puck between a left and right side of the frame using a hockey stick during use of the conditioning and training apparatus.

6. The conditioning and training apparatus of claim 1, wherein the front section does not comprise any physical structure that is higher than a highest point of the crankset when pedaled during use of the conditioning and training apparatus.

7. The conditioning and training apparatus of claim 1, further comprising:
   a first strap with a first end connected to the curved backrest and a second end with a first quick release locking and unlocking device; and
   a second strap with a first end connected to the curved backrest and a second end with a second quick release locking and unlocking device.

8. The conditioning and training apparatus of claim 1, further comprising:
   a wheel mounted to the frame and mechanically connected to the crankset, wherein the wheel is configured to provide resistance when the user pedals the crankset during use of the conditioning and training apparatus.

9. A conditioning and training apparatus, comprising:
   a curved backrest connected to a backrest post, wherein the curved backrest is configured to support a back of a user during use of the conditioning and training apparatus;
   a crankset and a pair of pedals, wherein the pair of pedals are configured to be pedaled by feet of the user in a circular or elliptical motion during the use of the conditioning and training apparatus;
   a frame comprising:
      a back section comprising a backrest tube for mounting and supporting the backrest post, wherein the back section is configured to be in contact with a floor,
      a middle section in front of the back section for mounting and supporting the crankset and the pair of pedals, and
      a front section in front of the middle section with at least one leg configured to be in contact with the floor;
   a wheel mounted to the frame and mechanically connected to the crankset, wherein the wheel is configured to provide resistance when the user pedals the crankset during use of the conditioning and training apparatus; and
   wherein the conditioning and training apparatus is designed and configured such that the user is capable of moving a hockey puck between a left and right side of the frame using a hockey stick during use of the conditioning and training apparatus.

10. The conditioning and training apparatus of claim 9, further comprising:
    a strap passing through a hollow passage formed through the curved backrest and the strap comprising a first end with a first quick release locking and unlocking device and a second end with a second quick release locking and unlocking device.

11. The conditioning and training apparatus of claim 10, wherein the first quick release locking and unlocking device for the first end of the strap and the second quick release locking and unlocking device for the second end of the strap comprises hood and loop fasteners.

12. The conditioning and training apparatus of claim 9, wherein
    the conditioning and training apparatus does not comprise a physical structure in front of the user designed and configured for placing hands of the user during use of the conditioning and training apparatus.

13. The conditioning and training apparatus of claim 9, wherein the conditioning and training apparatus does not comprise a seat designed and configured to receive a butt of the user.

14. The conditioning and training apparatus of claim 9, wherein the front section does not comprise any physical structure that is higher than a highest point of the crankset when pedaled during use of the conditioning and training apparatus.

15. The conditioning and training apparatus of claim 9, further comprising:
    a first strap with a first end connected to the curved backrest and a second end with a first quick release locking and unlocking device; and
    a second strap with a first end connected to the curved backrest and a second end with a second quick release locking and unlocking device.

* * * * *